United States Patent
Re (10) Patent No.: US 10,981,320 B2
(45) Date of Patent: Apr. 20, 2021

(54) APPARATUS FOR BLOW MOLDING PLASTIC CONTAINERS, PARTICULARLY BOTTLES

(71) Applicant: SACMI IMOLA S.C., Imola (IT)

(72) Inventor: Emilio Re, Bologna (IT)

(73) Assignee: SACMI IMOLA S.C., Imola (IT)

( * ) Notice: Subject to any disclaimer, the term of this patent is extended or adjusted under 35 U.S.C. 154(b) by 0 days.

(21) Appl. No.: 16/641,549

(22) PCT Filed: Aug. 30, 2018

(86) PCT No.: PCT/IB2018/056633
§ 371 (c)(1),
(2) Date: Feb. 24, 2020

(87) PCT Pub. No.: WO2019/043617
PCT Pub. Date: Mar. 7, 2019

(65) Prior Publication Data
US 2020/0207003 A1 Jul. 2, 2020

(30) Foreign Application Priority Data
Sep. 1, 2017 (IT) .................. 102017000098233

(51) Int. Cl.
*B29C 49/36* (2006.01)
*B29C 49/42* (2006.01)
(Continued)

(52) U.S. Cl.
CPC .......... *B29C 49/06* (2013.01); *B29C 49/4205* (2013.01); *B29C 49/36* (2013.01);
(Continued)

(58) Field of Classification Search
CPC ........ B29C 2049/4221; B29C 49/4215; B29C 49/4205; B29C 49/36; B65G 47/847
See application file for complete search history.

(56) References Cited

U.S. PATENT DOCUMENTS 5,110,282 A * 5/1992 Voss .................... B29C 49/4205
414/744.5
8,925,710 B2 1/2015 Borgatti et al.

FOREIGN PATENT DOCUMENTS

DE 19935267 A1 * 2/2001 ......... B29C 49/4215
DE 102010053476 A1 * 6/2012 .......... B65G 47/847
(Continued)

OTHER PUBLICATIONS

International Search Report dated Nov. 22, 2018 re: Application No. PCT/IB2018/056633, pp. 1-4, citing: EP 2 412 651 A1, DE 10 2011 116883 A1, EP 2 746 030 A1, US 8 925 710 B2 and EP 1 112 835 A2.

(Continued)

*Primary Examiner* — Robert B Davis
(74) *Attorney, Agent, or Firm* — Cantor Colburn LLP (57) ABSTRACT

An apparatus for blow molding plastic containers, particularly bottles, including a blow molding carousel, which can rotate about a main rotation axis and is functionally connected, at a first transfer station and at a second transfer station, to a line for feeding the preforms and to a line for unloading the bottles, the blow molding carousel supporting, at its peripheral region, a plurality of forming units arranged around the main rotation axis. Each forming unit has a mold that defines a first and a second forming cavity and is formed by two half-mold parts, which can move with respect to each other to pass between an open position for feeding the preforms and for unloading the bottles and a closed position, in which it defines at least one forming cavity.

8 Claims, 7 Drawing Sheets

(51) Int. Cl.
*B29C 49/06* (2006.01)
*B29C 49/48* (2006.01)
*B29L 31/00* (2006.01)

(52) U.S. Cl.
CPC ...... *B29C 49/48* (2013.01); *B29C 2049/4221* (2013.01); *B29L 2031/7158* (2013.01)

(56) References Cited

FOREIGN PATENT DOCUMENTS

| | | | |
|---|---|---|---|
| DE | 102011116883 A1 | 10/2012 | |
| EP | 1112835 A2 | 7/2001 | |
| EP | 2412651 A1 | 2/2012 | |
| EP | 2746030 A1 | 6/2014 | |
| EP | 2861514 B1 * | 8/2016 | ......... B29C 49/4205 |
| WO | 2010013206 A2 | 2/2010 | |

OTHER PUBLICATIONS

IT Search Report dated Apr. 23, 2018 re: Application No. 2017000098233, pp. 1-7, citing: EP 2 412 651 A1, DE 10 2011 116883 A1, EP 2 746 030 A1, US 8 925 710 B2 and EP 1 112 835 A2.
Written Opinion dated Nov. 22, 2018 re: Application No. PCT/IB2018/056633, pp. 1-5, citing: EP 2 412 651 A1, DE 10 2011 116883 A1 and EP 2 746 030 A1.

* cited by examiner

APPARATUS FOR BLOW MOLDING PLASTIC CONTAINERS, PARTICULARLY BOTTLES

TECHNICAL FIELD

The present disclosure relates to an apparatus for blow molding plastic containers, particularly bottles.

BACKGROUND

Apparatuses for blow molding plastic containers are known and widely used which comprise a blow molding carousel which can rotate about its own axis and is provided, at its own peripheral portion, with a plurality of forming or blow molding units.

The blow molding units each comprise two half-mold parts, each of which is movable with respect to the other between an open position and a closed position.

Each blow molding unit can define one or two forming cavities for the blow molding of respective bottles starting from corresponding preforms.

In many cases, the two half-mold parts are oriented so as to close at a closure plane that is substantially radial with respect to the advancement path of the forming unit.

WO2010/013206 in the name of this same applicant discloses an apparatus for blow molding plastic containers which comprises a blow molding machine for blow molding bottles, a line for supplying preforms to the blow molding machine, and a line for unloading the bottles from the blow molding machine.

The blow molding machine comprises a blow molding carousel, which can rotate about a vertical axis and is functionally connected, at a first transfer station and at a second transfer station, to the preform supply line and to the bottle unloading line.

The carousel supports, at its own peripheral edge, a plurality of forming units, which are evenly distributed around the carousel axis with a specific pitch.

Each forming unit comprises a mold formed by two half-mold parts, each one of which is pivoted to the carousel in order to rotate, under the thrust of an actuation device, about a pivoting axis which is parallel to the carousel axis between an open position and a closed position in which it forms two forming cavities.

The two half-mold parts are oriented so as to close at a closing plane that is substantially tangent with respect to the path of the forming unit.

The feeding of the preforms to the forming units is provided by using a transfer carousel which can rotate about an axis that is parallel to the axis of the blow molding carousel and has, along its own peripheral edge, a plurality of grip units which protrude radially.

Each grip unit comprises a supporting rocker, which is pivoted to the transfer carousel to rotate about a substantially vertical pivoting axis and provided, at a first arm thereof, with a cam follower adapted to contact a cam adapted to control the angular position of the rocker about the pivoting axis.

The rocker has a second elongated arm engaged so that it can slide by a slider, which is provided in turn with a cam follower which makes contact with a cam adapted to control the position of the slider along the arm and supports, at one of its free ends that protrudes outside said arm, a grip assembly comprising a rocker body which is pivoted to the slider in order to rotate, with respect to the slider and under the thrust of a mechanical or motorized actuation device, about a vertical fulcrum axis.

The arm supports two parallel and laterally adjacent grip elements, which are mutually spaced at the same distance that there is between the two forming cavities defined in the same forming unit.

The solution described above, while allowing to supply the preforms to the forming units, even if each one of these units defines two half-mold parts with a closing plane that is tangent to the main carousel, has some drawbacks.

First of all, it is observed a certain complexity in the kinematic system for the movement of the grip elements with a large number of degrees of freedom, which must be managed appropriately.

Moreover, because of how the grip elements are structured, the pickup of the preforms from the supply line must be performed along a curved portion of the supply line at which the preform distribution pitch in practice matches the distance between the forming cavities of the same forming unit.

EP2412651 describes and illustrates a transferring star-wheel for a bottling plant, as well as a method for transferring preforms and containers in bottling plants.

This transferring star-wheel comprises first grip means functionally active on unprocessed preforms or containers and second grip means functionally active on formed or processed containers.

The transferring star-wheel can be moved toward a processing station so that the first grip means send the unprocessed preforms or containers to the processing station and so that the second grip means pick up the molded or processed containers from the second processing station.

In particular, the first grip means are arranged on the star-wheel so as to be alternated with the second grip means.

In this case, both the first grip means and the second grip means follow the same path but have different work portions.

In any case, only the first grip means operate between the input and the processing assembly and only the second grip means operate between the processing assembly and the output.

SUMMARY

The aim of the present disclosure is to provide an apparatus for blow molding plastic containers, particularly bottles, that is capable of improving the background art in one or more of the above mentioned aspects.

Within this aim, the disclosure provides an apparatus for blow molding plastic containers, particularly bottles, that is structurally simple and extremely flexible in its use.

The present disclosure proposes an apparatus for blow molding plastic containers that has limited space occupation and is capable of facilitating the operations for maintenance and access to the various components.

The disclosure further provides an apparatus for blow molding plastic containers, particularly bottles, that is highly reliable, relatively easy to provide and at competitive costs.

This aim and these and other advantages that will become better apparent hereinafter are achieved by providing an apparatus for blow molding plastic containers, particularly bottles, according to claim 1, optionally provided with one or more of the characteristics of the dependent claims.

BRIEF DESCRIPTION OF THE DRAWINGS

Further characteristics and advantages of the disclosure will become better apparent from the description of some preferred but not exclusive embodiments of the apparatus for blow molding plastic containers, particularly bottles, according to the disclosure, illustrated by way of non-limiting example in the accompanying drawings, wherein.

DETAILED DESCRIPTION OF THE DRAWINGS

Figure 1:
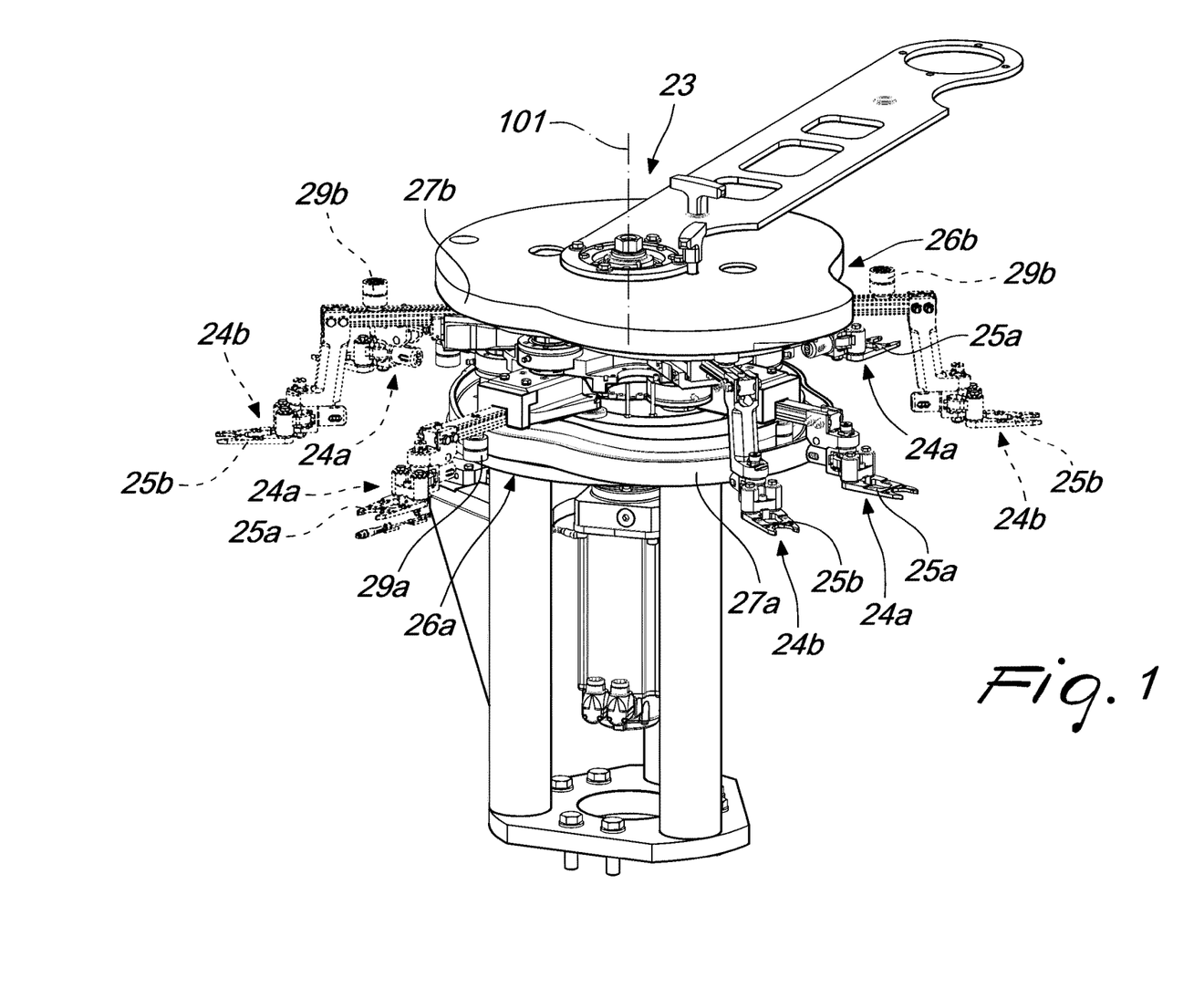
FIG. 1 is a perspective view of a transfer carousel in which some grip elements shown with dashed lines are arranged so as to be extracted in a radial direction and disengaged from the respective movement means.
Figure 2:
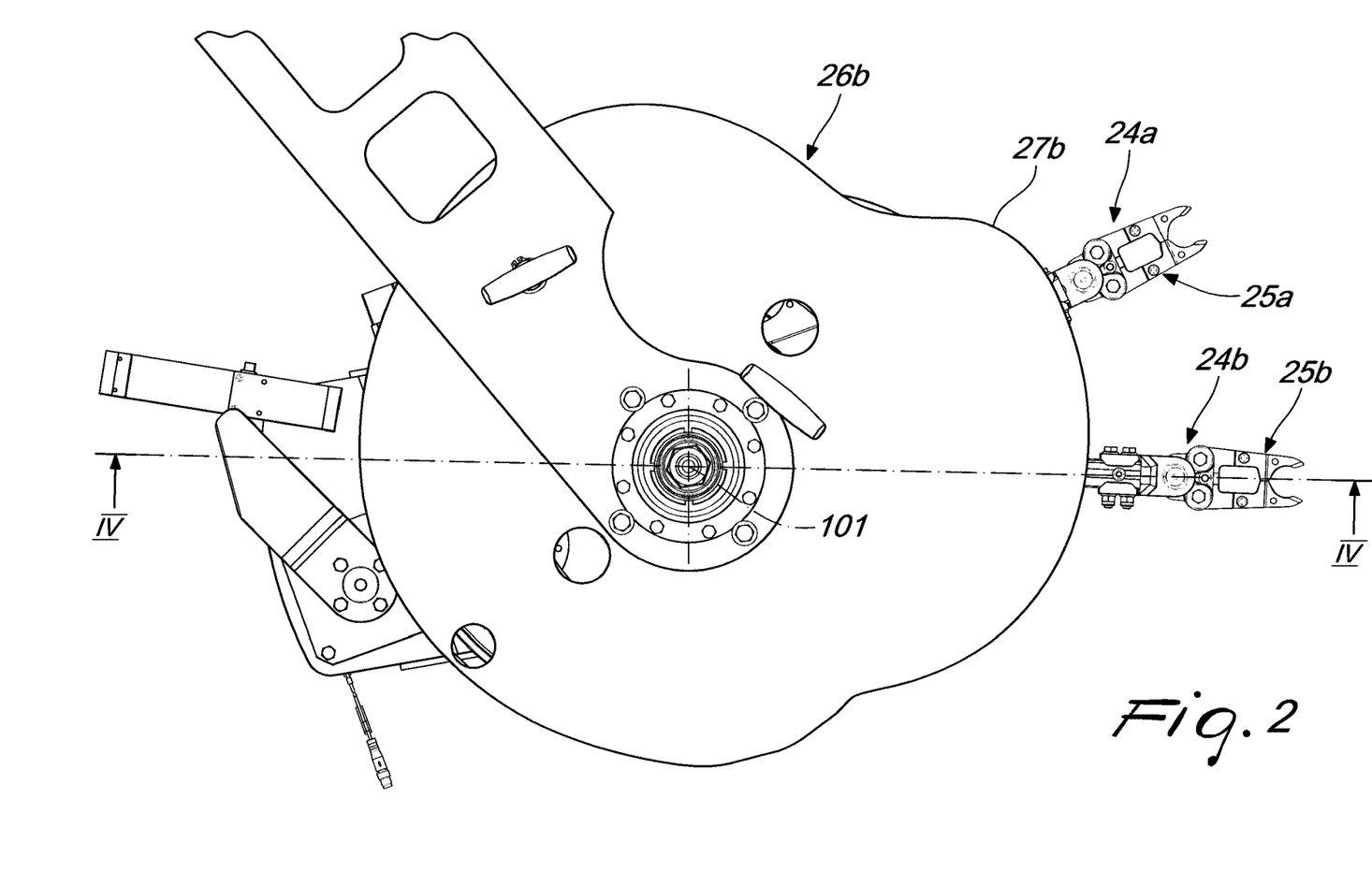
FIG. 2 is a top view of the transfer carousel.
Figure 3:
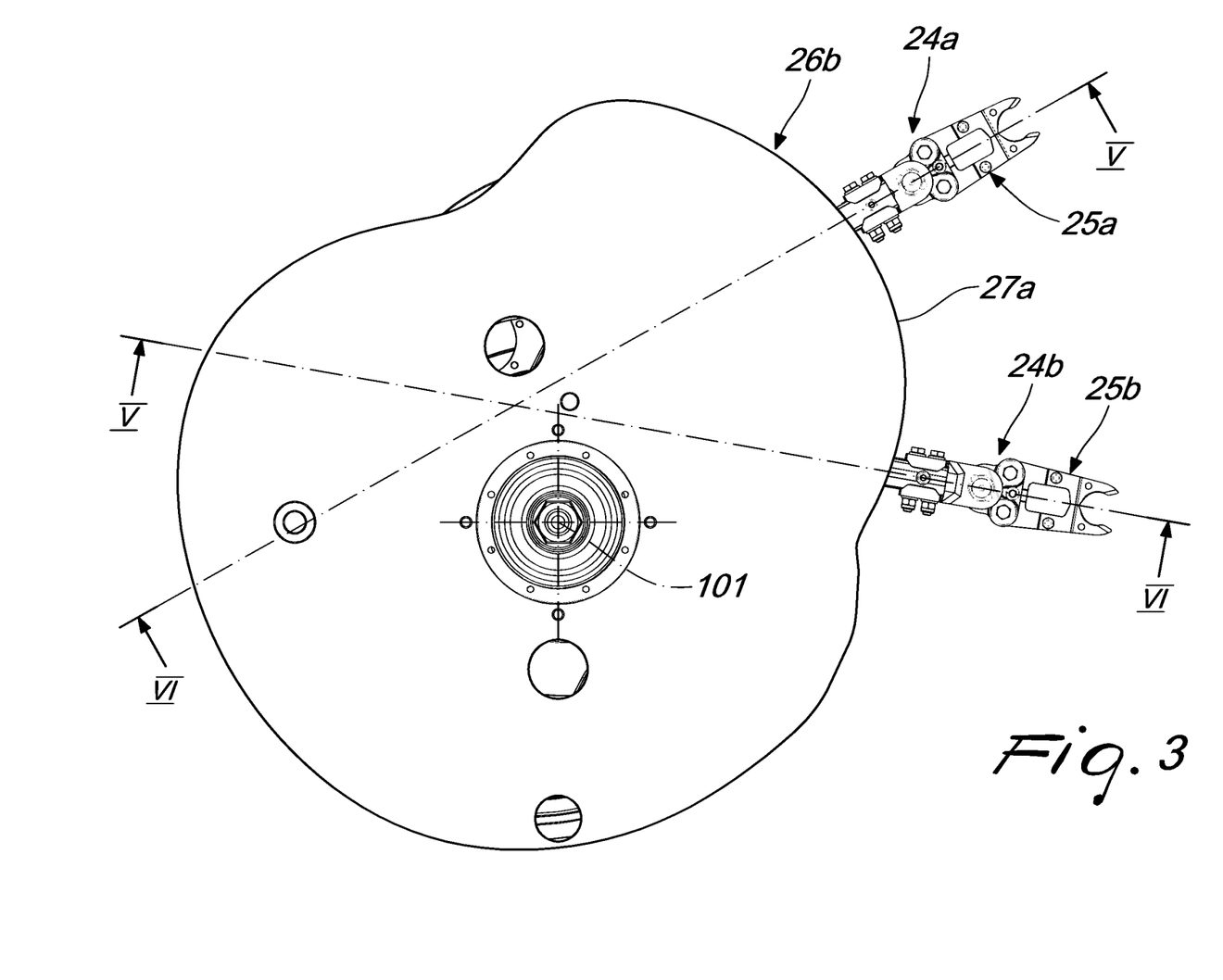
FIG. 3 is a sectional view of the transfer carousel, taken along a substantially horizontal plane arranged between the first cam and the second cam.
Figure 4:
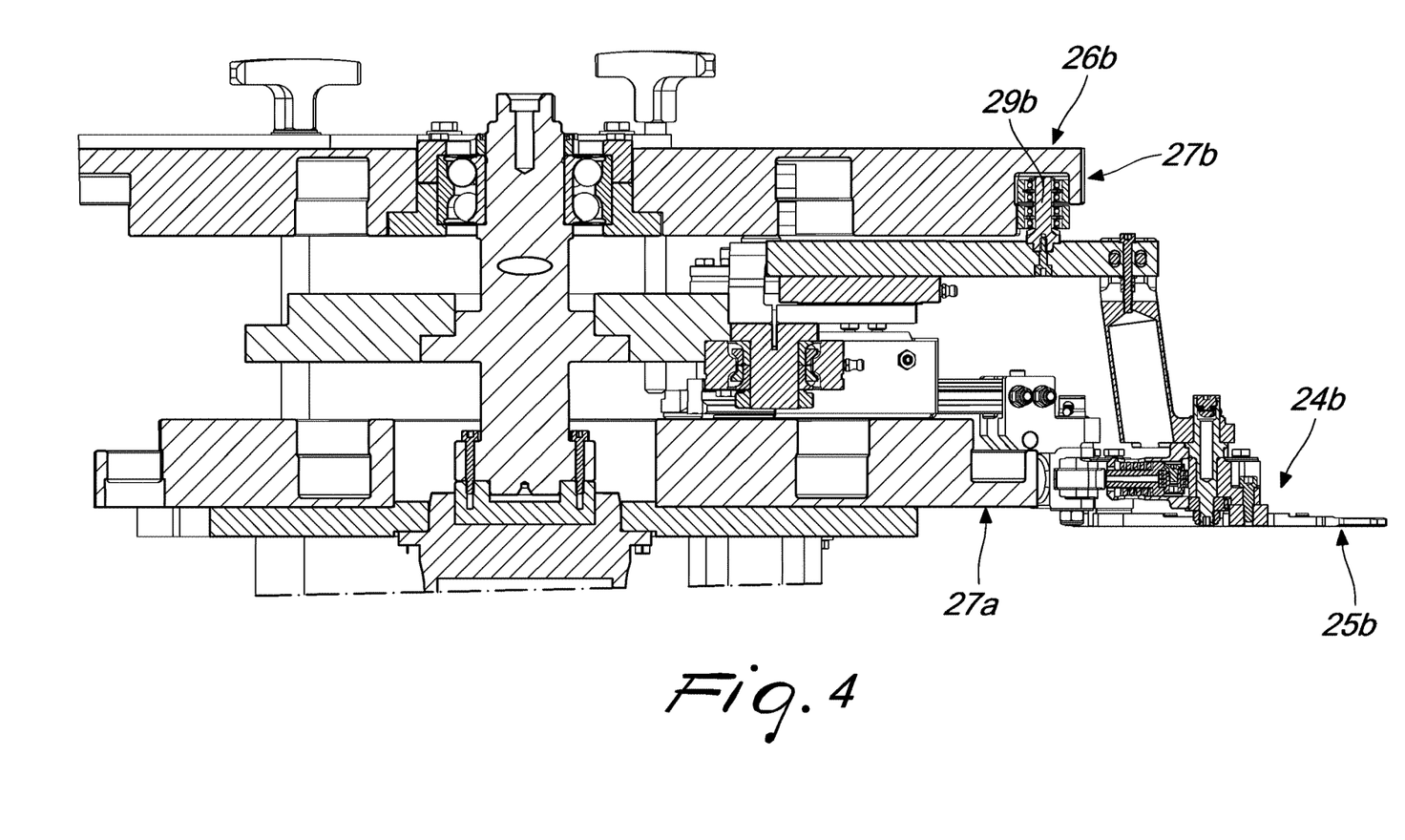
FIG. 4 is a sectional view, taken along the plane of arrangement indicated by the line IV-IV of FIG. 2.
Figure 5:
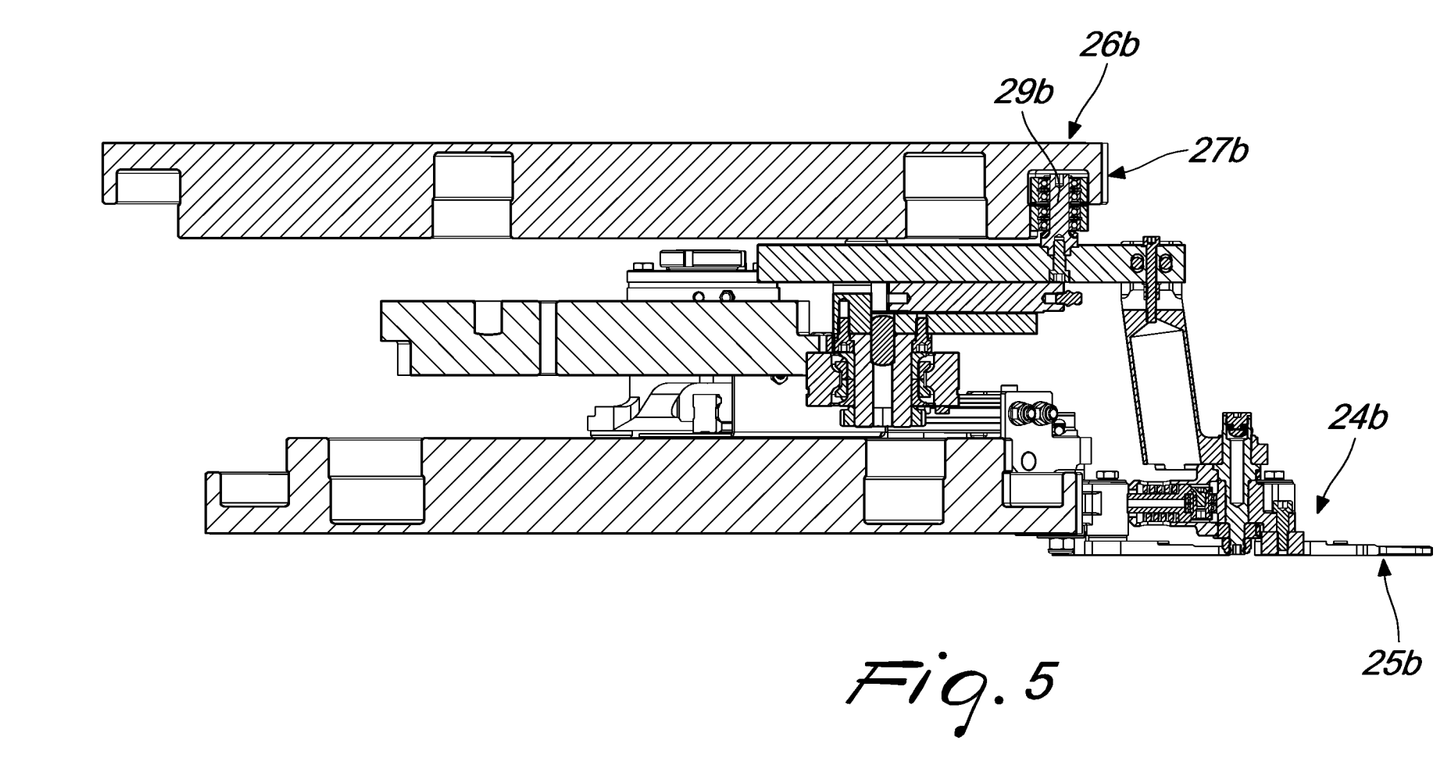
FIG. 5 is a sectional view, taken along the plane of arrangement indicated by the line V-V of FIG. 3.
Figure 6:
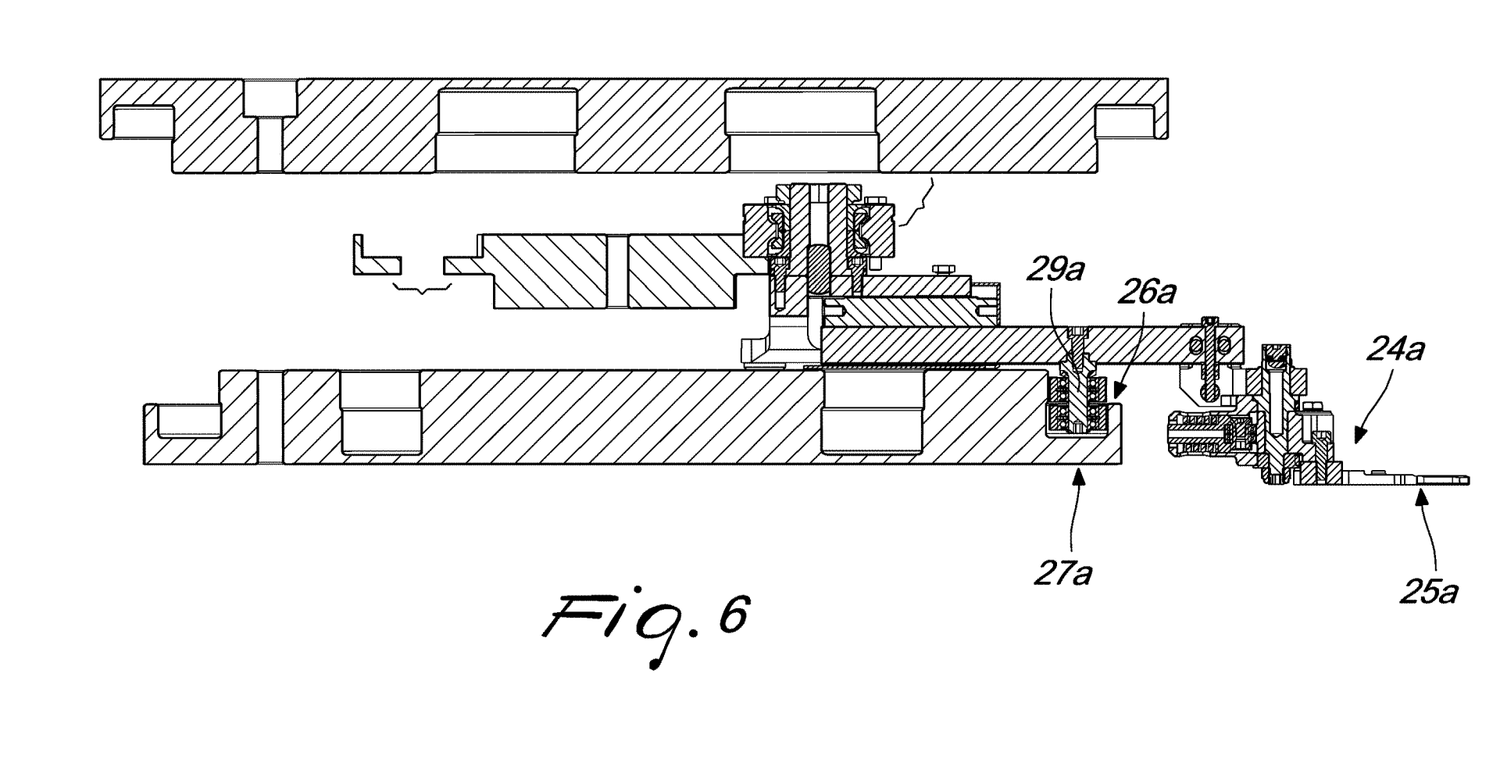
FIG. 6 is a sectional view, taken along the plane of arrangement indicated by the line VI-VI of FIG. 3.
Figure 7:
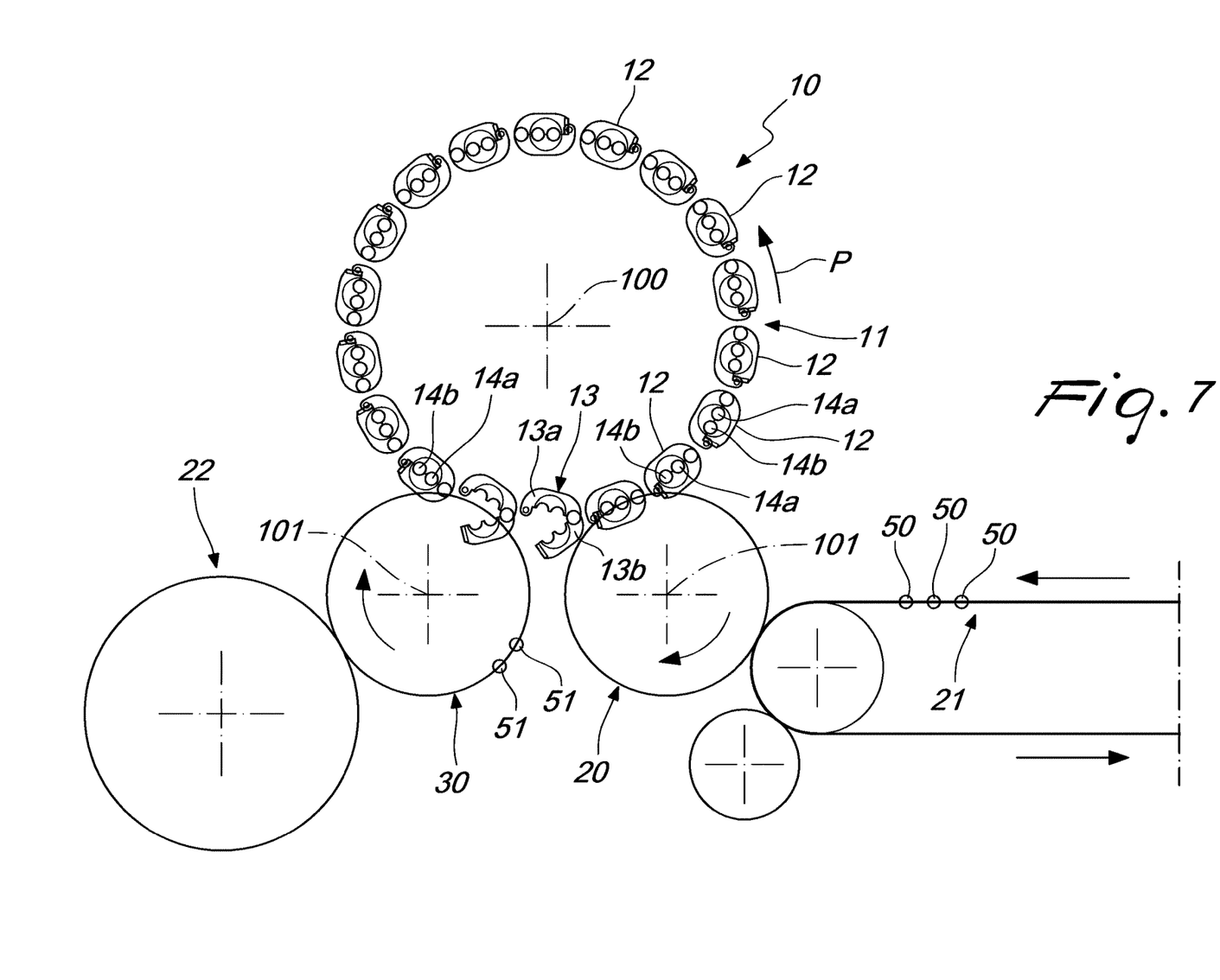
FIG. 7 is a schematic top view of the apparatus according to the disclosure.

With reference to the figures, the apparatus for blow molding plastic containers, particularly bottles, according to the disclosure, generally designated by the reference numeral 1, comprises a blow molding carousel 10, which can rotate about a main rotation axis 100 and is functionally connected, at first and second transfer stations 20, 30, to a preform supply line 21 and to a bottle unloading line 22.

The blow molding carousel 10 supports, at its own peripheral region 11, a plurality of forming units 12 arranged around the main rotation axis 100.

Each forming unit 12 comprises a mold 13 formed by two half-mold parts 13a, 13b, which can move with respect to each other in order to pass between an open position, for feeding the preforms 50 and for unloading the bottles 51, and a closed position, in which it defines at least one forming cavity 14.

The first transfer station 20 comprises a transfer carousel 23 which can rotate about an axis 101 of the transfer carousel which is parallel to the main rotation axis 100.

The transfer carousel 23 supports a plurality of grip elements 24a, 24b associated with a respective grip body 25a, 25b adapted to pick up a respective preform 50 from the supply line 21 in order to feed it to a respective forming cavity 14.

According to the present disclosure, the transfer carousel 23 supports first grip elements 24a functionally associated with first movement means 26a adapted to define, for each grip body 25a associated with the first grip elements 24a, a first movement trajectory, and second grip elements 24b functionally associated with second movement means 26b adapted to define, for each grip body 25b associated with the second grip elements 24b, a second movement trajectory.

Conveniently, the second movement trajectory is different from the first movement trajectory.

In particular, the first movement trajectory and the second movement trajectory are different in order to allow the respective grip bodies 25a, 25b to feed the preforms 50 to the respective forming cavities 14 at respective release regions arranged in mutually different positions.

By way of example, the respective release regions are arranged so as to be mutually angularly spaced around the main rotation axis 100.

The respective release regions may also mutually spaced apart in a radial direction with respect to the main rotation axis 100.

According to one particularly important aspect of the present disclosure, the first grip elements 24a and the second grip elements 24b are arranged so as to be mutually alternated around the main rotation axis 101 of the transfer carousel 23.

Advantageously, each mold 13 defines a first and a second forming cavity 14a, 14b.

The first cavity 14a is arranged, for example, upstream of the second cavity 14b with respect to the advancement direction of the blow molding carousel 10.

The first grip elements 24a are adapted to feed a respective preform 50 at the first forming cavities 14a and the second grip elements 24b are adapted to feed a respective preform 50 at the second forming cavities 14b.

The disclosure allows therefore to feed, with a single transfer carousel, the preforms to molds by picking up the preforms fed with a preset pitch and releasing them with alternated variable pitches, thus providing different trajectories so as to allow to feed the preforms to molds each having two cavities.

Conveniently, the first movement means 26a comprise a first cam 27a which is supported by a supporting structure and can be engaged by at least one first engagement element 29a associated with first grip elements 24a during their rotation about the axis 101 of the transfer carousel 23.

Advantageously, the second movement means 26b comprise a second cam 27b which is supported by the supporting structure and can be engaged by at least one second engagement element 29b associated with the second grip elements 24b during their rotation about the axis 101 of the transfer carousel 23.

Conveniently, the first movement means 26a are arranged at a different height with respect to the second movement means 27a.

With reference to the practical embodiment shown in the figures, if the first and second movement means 25a, 26b comprise a first and a second cam 26a, 27b, these cams are extended, around the main rotation axis 101, on respective planes of arrangement which are substantially horizontal and mutually parallel and spaced in a vertical direction.

The grip bodies 25a associated with the first grip elements 24a and the grip bodies 25b associated with the second grip elements 24b lie at the same height.

Preferably, the second transfer station 30 comprises an unloading carousel 33 substantially configured like the transfer carousel 23.

According to a further aspect, the present disclosure relates to an apparatus for blow molding plastic containers, particularly bottles, generally designated by the reference numeral 1, which comprises a blow molding carousel 10, which can rotate about a main rotation axis 100 and is functionally connected, at a first and a second transfer station 20, 30, to a preform supply line 21 and to a bottle unloading line 22.

The blow molding carousel 10 supports, at its own peripheral region 11, a plurality of forming units 12 arranged around the main rotation axis 100.

Each forming unit 12 comprises a mold 13 formed by two half-mold parts 13a, 13b, which can move with respect to each other to pass between an open position for feeding the preforms 50 and for unloading the bottles 51 and a closed position, in which it defines at least one forming cavity 14.

The second transfer station 30 comprises a transfer carousel 23, which can rotate about a transfer carousel axis 101 which is parallel to the main rotation axis 100.

The transfer carousel 23 supports a plurality of grip elements 24a, 24b associated with a respective grip body 25a, 25b adapted to pick up a respective bottle 51 from the forming carousel 10 in order to feed it to the unloading line 22.

According to the present disclosure, the transfer carousel 23 supports first grip elements 24a functionally associated with first movement means 26a adapted to define, for each grip body 25a associated with the first grip elements 24a, a first movement trajectory, and second grip elements 24b functionally associated with second movement means 26b adapted to define, for each grip body 25b associated with the second grip elements 24b, a second movement trajectory that is different from the first movement trajectory.

The transfer carousel 23 can have one or more of the above described characteristics.

The operation of the apparatus for blow molding plastic containers, particularly bottles, is as follows.

The supply line 21 feeds the preforms 50, which are picked up, at the first transfer station 20, by the transfer carousel 23.

The preforms arriving along the supply line 21 are picked up, alternately, by first grip elements 25a associated with the first movement means 26a and second grip elements 25b associated with the second movement means 26b.

The preforms 50 transported by the first grip elements 25a and by the contiguous second grip elements 25b may be then deposited at the same mold 13 that defines a first forming cavity 14a, inside which the preform 50 transported by the first grip elements 25a will be fed, and a second forming cavity 14b, inside which the preform 50 transported by the first grip elements 25a will be fed.

The half-mold parts are then brought to the closed position and the bottles are then formed during the rotation of the forming units about the main rotation axis of the blow molding carousel.

At the second transfer station 30, the two half-mold parts are brought to the open position in order to allow the unloading of the formed bottle or bottles 51 and the feeding of the preforms 50 that arrive from the supply line 21.

As already described earlier, the second transfer carousel 30 also may comprise a transfer carousel 23.

The apparatus 1 may also have only the second transfer station 30 comprising the transfer carousel 23.

In this case, the first movement trajectory and the second movement trajectory are different in order to allow the respective grip bodies 25a, 25b to unload the bottles 51 to the respective forming cavities 14, and particularly from the first forming cavity 14a and from the second forming cavity 14b.

The first grip elements 24a are adapted in particular to unload a respective bottle 51 from the first forming cavities 14a, while the second grip elements 24b are adapted to unload a respective bottle 51 from the second forming cavities 14b.

The operation of the apparatus 1 with molds that define only one forming cavity entails simply the replacement of the molds and the removal of the first or second grip elements 25a, 25b.

In practice it has been found that the disclosure achieves the intended aim and advantages.

The disclosure thus conceived is susceptible of numerous modifications and variations, all of which are within the scope of the appended claims; all the details may further be replaced with other technically equivalent elements.

In practice, the materials used, as well as the contingent shapes and dimensions, may be any according to the requirements and the state of the art.

The disclosures in Italian Patent Application no. 102017000098233, from which this application claims priority, are incorporated herein by reference.

The invention claimed is:

1. An apparatus for blow molding plastic containers, the apparatus comprising:
a blow molding carousel configured to rotate about a main rotation axis and is functionally connected, at a first transfer station and at a second transfer station, to a line for feeding preforms and to a line for unloading the bottles, said blow molding carousel supporting, at its peripheral region, a plurality of forming units arranged around a main rotation axis, each forming unit comprising a mold that defines a first forming cavity and a second forming cavity and is formed by two half-mold parts configured to move with respect to each other to pass between an open position for feeding the preforms and for unloading the bottles and a closed position configured to define at least one forming cavity, said first transfer station comprising a transfer carousel configured to rotate about an axis of the transfer carousel that is parallel to a main rotation axis and supports a plurality of grip elements associated with a respective grip body adapted to pick up a respective preform from said supply line to feed it to a forming cavity,
wherein said transfer carousel supports first grip elements functionally associated with first movement means adapted to define, for each grip body associated with said first grip elements, a first movement trajectory, and second grip elements functionally associated with second movement means adapted to define, for each grip body associated with said second grip elements, a second movement trajectory, said first movement trajectory and said second movement trajectory being different in order to allow the respective grip bodies to feed the preforms to the respective forming cavities at respective release regions arranged in mutually different positions, said first grip elements being adapted to feed a respective preform at said first forming cavities and said second grip elements being adapted to feed a respective preform at said second forming cavities.

2. The apparatus according to claim 1, wherein said first movement means comprise a first cam supported by a supporting structure and configured to be engaged by at least one first engagement element associated with said first grip elements during their rotation about the axis of the transfer carousel.

3. The apparatus according to claim 2, wherein said second movement means comprise a second cam supported by said supporting structure and configured to be engaged by at least one second engagement element associated with said second grip elements during their rotation about the axis of the transfer carousel.

4. The apparatus according to claim 1, wherein said second transfer station comprises an unloading carousel substantially configured like said transfer carousel.

5. The apparatus according to claim 1, wherein said first movement means are arranged at a different height with respect to said second movement means.

6. The apparatus according to claim 1, wherein said first grip elements and said second grip elements are arranged so as to be mutually alternated about the main rotation axis of said transfer carousel.

7. The apparatus according to claim 1, wherein the grip bodies associated with the first grip elements and the grip bodies associated with the second grip elements lie at a same height.

8. An apparatus for blow molding plastic containers, said apparatus comprising:

a blow molding carousel configured to rotate about a main rotation axis and is functionally connected, at a first transfer station and at a second transfer station, to a line for feeding preforms and to a line for unloading bottles, said blow molding carousel supporting, at its peripheral region, a plurality of forming units arranged around the main rotation axis, each forming unit comprising a mold, defining a first and a second forming cavity, and being formed by two half-mold parts, configured to move with respect to each other to pass between an open position for feeding the preforms and for unloading the bottles and a closed position, in which it defines at least one forming cavity, said first transfer station comprising a transfer carousel configured to rotate about an axis of the transfer carousel that is parallel to the main rotation axis, and supports a plurality of grip elements associated with a respective grip body adapted to pick up a respective bottle from a respective forming cavity, in order to transfer it to said unloading line, wherein said transfer carousel supports first grip elements functionally associated with first movement means adapted to define, for each grip body associated with said first grip elements, a first movement trajectory, and second grip elements functionally associated with second movement means adapted to define, for each grip body associated with said second grip elements, a second movement trajectory, said first movement trajectory and said second movement trajectory being different in order to allow the respective grip bodies to unload the bottles to the respective forming cavities, said first grip elements being adapted to unload a respective bottle from said first forming cavities and said second grip elements being designed to unload a respective bottle from said second forming cavities.

* * * * *